(12) United States Patent
Bedi (10) Patent No.: US 7,179,012 B2
(45) Date of Patent: Feb. 20, 2007

(54) SPRING-OPENED LOCK WITH A PLUNGER THAT MOVES PERPENDICULAR TO A LONGITUDINAL AXIS OF THE SPRING

(75) Inventor: Daljit S. Bedi, Ontario (CA)

(73) Assignee: Navreet Kainth, Ontario (CA)

( * ) Notice: Subject to any disclaimer, the term of this patent is extended or adjusted under 35 U.S.C. 154(b) by 0 days.

(21) Appl. No.: 11/023,539

(22) Filed: Dec. 29, 2004

(65) Prior Publication Data

US 2006/0138786 A1 Jun. 29, 2006

(51) Int. Cl.
*B25C 3/18* (2006.01)
*E05C 19/00* (2006.01)

(52) U.S. Cl. .................. 403/325; 292/1; 292/179; 292/177; 403/324

(58) Field of Classification Search ........... 292/1, 292/177, 179 X, 180, 300, 302, 303, 341.15, 292/42, 304; 403/325, 324, 322.1, 321; 24/457, 24/458

See application file for complete search history.

(56) References Cited

U.S. PATENT DOCUMENTS

| | | | |
|---|---|---|---|
| 787,466 A | 4/1905 | Preece | |
| 3,024,053 A * | 6/1962 | Williams et al. | 292/21 |
| 3,624,880 A | 12/1971 | Justus et al. | |
| 3,663,047 A * | 5/1972 | Zawadzki | 292/92 |
| 4,312,528 A * | 1/1982 | Hall et al. | 292/92 |
| 4,927,305 A | 5/1990 | Peterson, Jr. | |
| 5,490,696 A * | 2/1996 | Hutson | 292/92 |
| 5,622,729 A * | 4/1997 | Mower | 425/87 |
| 5,692,855 A * | 12/1997 | Burton | 403/325 |
| 5,857,372 A | 1/1999 | Sendzimir et al. | |
| 5,975,592 A * | 11/1999 | Lin | 292/37 |
| 6,065,897 A * | 5/2000 | Lutz, III | 403/325 |
| 6,145,897 A * | 11/2000 | Locher | 292/92 |
| 6,238,130 B1 * | 5/2001 | Youngers | 403/322.4 |
| 6,250,577 B1 | 6/2001 | Koenig | |
| 6,485,216 B1 * | 11/2002 | Cheng | 403/102 |
| 6,537,031 B1 | 3/2003 | Bacskay | |
| 6,619,878 B2 * | 9/2003 | Wang et al. | 403/374.3 |
| 6,669,047 B2 * | 12/2003 | Wooderson et al. | 220/316 |
| 6,712,096 B1 | 3/2004 | Tischler | |
| 6,769,832 B2 * | 8/2004 | Bedi | 403/352 |
| 6,925,939 B2 * | 8/2005 | Cleveland | 102/378 |
| 6,942,118 B2 * | 9/2005 | Zethoff et al. | 220/254.5 |

* cited by examiner

*Primary Examiner*—Gary Estremsky
*Assistant Examiner*—Mark Williams
(74) *Attorney, Agent, or Firm*—Young & Thompson (57) ABSTRACT

A lock joins two bodies together. The first body has a first hole and the second body has a second hole, and the lock includes a rail on the first body adjacent to the first hole, two spaced-apart cradles movable on the rail, a spring between and attached to the two cradles that urges the two cradles toward each other, a plunger that moves perpendicular to a longitudinal axis of the spring through the first hole, where the plunger has a locking end that moves into the second hole to join the bodies together. The lock has two levels that are each hinged to a different one of the cradles and to the plunger and that cause the locking end of the plunger to retreat from the second hole to unlock the bodies when the cradles move toward each other.

20 Claims, 8 Drawing Sheets

SPRING-OPENED LOCK WITH A PLUNGER THAT MOVES PERPENDICULAR TO A LONGITUDINAL AXIS OF THE SPRING

BACKGROUND OF THE INVENTION

The present invention is directed to a lock that joins two bodies together. More particularly, the invention is directed to lock that is carried by one body and has a plunger that extends through the one body into another body to hold the two bodies in position relative to each other.

This application relates to the present applicant's U.S. Pat. No. 6,769,832 and copending U.S. patent application Ser. No. 10/849,467 that disclose another lock and that are incorporated by reference.

SUMMARY OF THE INVENTION

An object of the present invention is to provide a novel lock that joins two bodies together with a plunger that is moved to an unlocked position by operation of a tensioning device that is longitudinally aligned perpendicular to the plunger.

A further object of the present invention is to provide a novel lock that joins two bodies together, where the first body has a first hole and the second body has a second hole, and the lock includes a rail on the first body adjacent to the first hole, two spaced-apart cradles separately movable on the rail, a spring between and attached to the two cradles and that urges the two cradles toward each other, a plunger between the two cradles and that extends through the first hole where the plunger has a locking end that moves into the second hole to join the two bodies together, and two levers that are each hinged to a different one of the cradles and to the plunger and that cause the locking end of the plunger to retreat from the second hole to unlock the two bodies when the two cradles move toward each other.

A yet further object of the present invention is to provide this novel lock in which the plunger has a circumferential groove and the lock further includes a movable wedge that selectively engages the groove to hold the plunger in the lock position.

Another object of the present invention is to provide this novel lock that further includes a cap on the locking end of the plunger, where the cap has a sealable chamber in which a distal end of the plunger is exposed and a passageway for creating a partial vacuum in the chamber to hold the plunger in the lock position and/or for increasing a pressure in the chamber to expel the locking end from the cap.

Yet another object of the present invention is to provide this novel lock with a motor-operated release mechanism that includes a fixed member that extends generally parallel to the plunger and that has a notch therein, a movable bracket that engages an end of the plunger, and a flange that is rotatably attached to the bracket, where the flange engages the notch in the fixed member to hold the plunger in the lock position and is rotatable out of engagement with the notch to permit the spring to move the two cradles toward each other and thereby move the plunger to the unlock position.

These and other objects and advantages of the invention will be apparent to those of skill in the art of the present invention after consideration of the following drawings and description of preferred embodiments.

DESCRIPTION OF PREFERRED EMBODIMENTS

Figure 1:
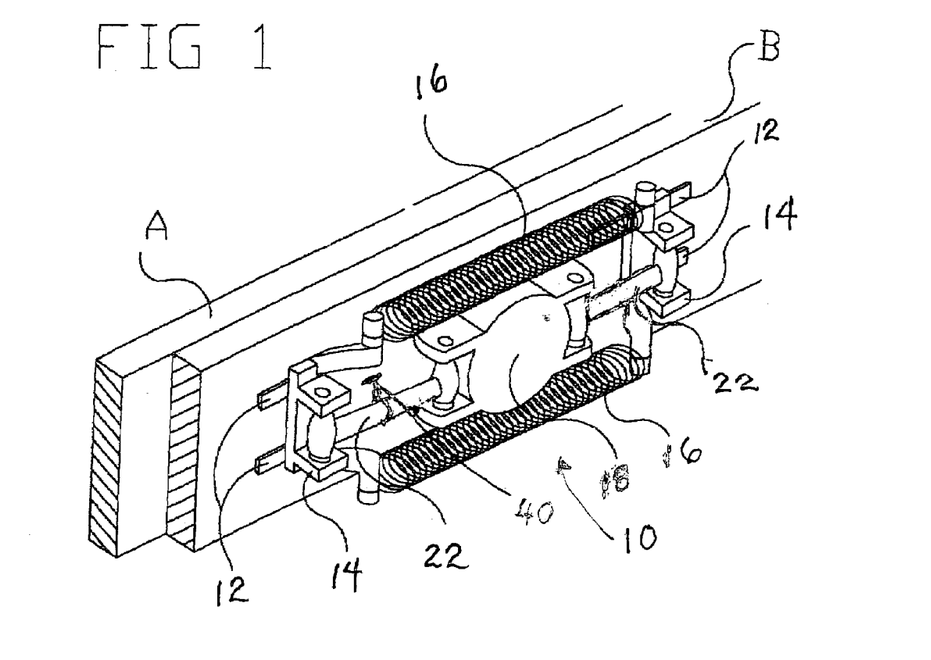
FIG. 1 is pictorial representation of an embodiment of the present invention in the lock position.

With reference now to FIG. 1, an embodiment of the present invention is a lock 10 for joining two bodies A, B together (joined together—or joined to each other—meaning that the two bodies are prevented from moving relative to each in at least one direction).

The lock 10 includes at least one rail 12 and two spaced-apart cradles 14 that are each movable on the rail 12. At least one tensioning device 16 is between and attached to the two cradles 14. The tensioning device 16 urges the two cradles 14 toward each other on the rail 12. A plunger 18 is between the two cradles 14 and is movable perpendicular to a longitudinal axis of the tensioning device 16 between a lock position and an unlock position. As may be more apparent from FIGS. 2–4, the plunger 18 is in the lock position when a locking end 20 of the plunger 18 is spaced a first distance from the rail 12 and in the unlock position when the locking end 20 is closer to the rail 12 than the first distance (i.e., no longer sufficient to join the two bodies together). Two levers 22 are each hinged to a different one of the two cradles 14 and are each hinged to the plunger 18. The two levers 22 cause the plunger 18 to retreat from the lock position to the unlock position when the two cradles 14 move toward each other, such as shown in FIG. 2.

Figure 2:
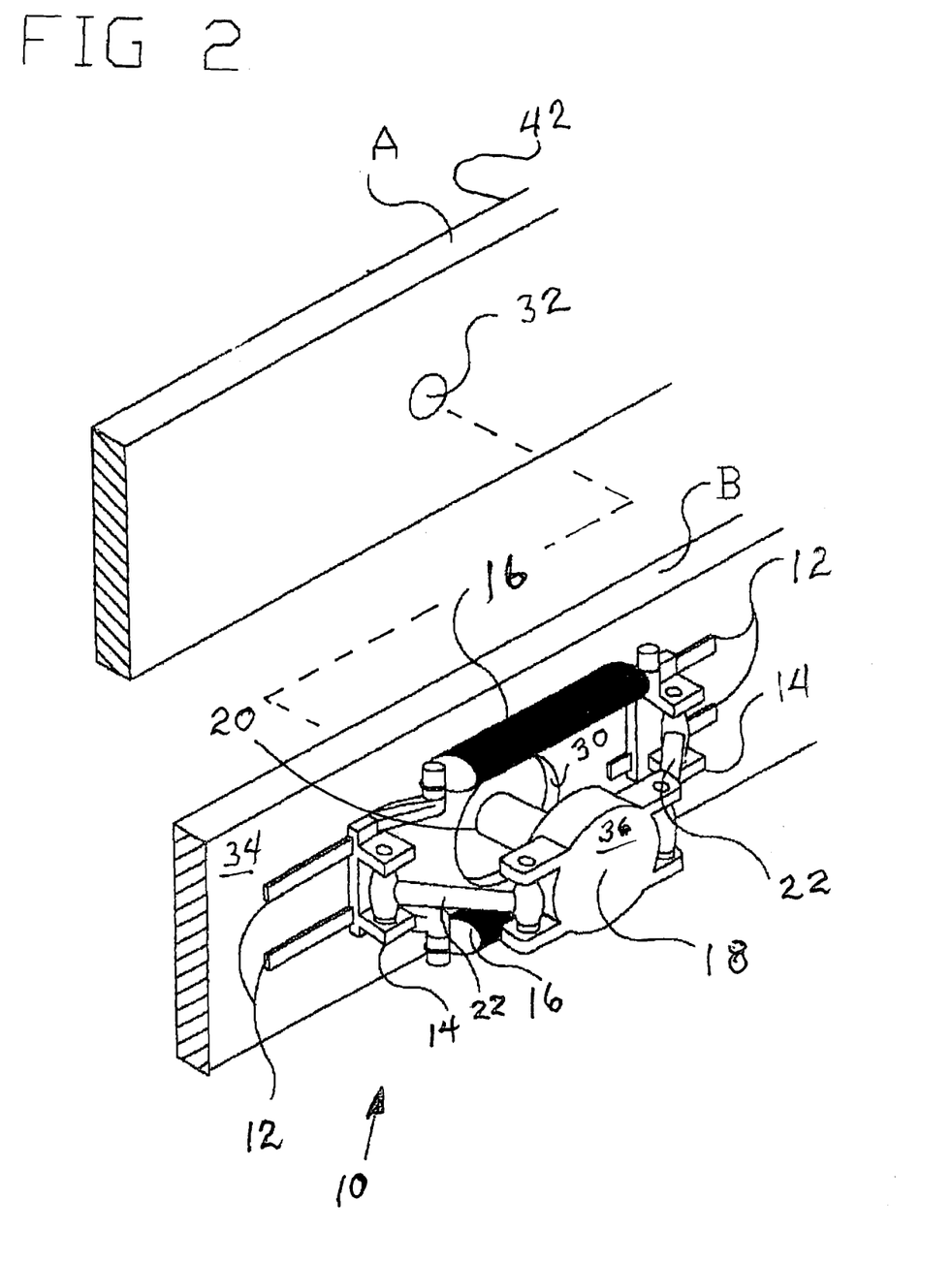
FIG. 2 is an exploded pictorial representation of the embodiment of FIG. 1 in the unlock position.

With further reference to FIGS. 1 and 2, a more particular embodiment is a combination of the two bodies A, B and the lock 10 that joins them to each other. The body B has a first hole 30 entirely through the body B and the body A has a second hole 32 at least partially through the body A. The first and second holes 30, 32 are in registration when the bodies A, B are joined by the lock 10. The rail 12 of the lock 10 is on a first surface 34 of the body B opposite the body A and is adjacent to the first hole 30. The plunger 18 extends from the first surface 34 through the first hole 30 and the locking end 20 of the plunger 18 is selectively movable into the second hole 32 to join the bodies A, B to each other. Movement of the two cradles 14 toward each other on the rail 12 causes the locking end 20 to retreat from the second hole 32.

In other embodiments, the lock 10 may include two of the rails 12 that are generally parallel to each other, with the plunger 18 and first hole 30 between the two rails 12. The rails 12 may have a gap between respective sections on which the two cradles 14 move to make room for the first hole 30. The lock 10 may have two of the tensioning devices 16 spaced so as not to interfere with the movement of the plunger 18 between the lock and unlock positions. The tensioning devices 16 may be coil springs that are longitudinally aligned perpendicular to the direction of movement of the plunger 18. The plunger 18 may have a top section 36 that is opposite the locking end 20 and to which the levers 22 are attached. The locking end 20 may have a diameter different than the top section 36 as is appropriate for a use of the lock 10. The body B may be provided with a recess for receiving the top section 36.

As shown in FIG. 1, the lock 10 may also include a tie-down 40 that is detachably attached to at least one of the two levers 22 and to the body B or rail 12 and that holds the plunger 18 in the lock position. Detachment of the tie-down 40 permits the tensioning device 16 to move the cradles 14 toward each other on the rail 12 and thereby move the plunger 18 to the unlock position. The tie-down 40 may include an explosive, cutter or the like to release the tie-down 40 upon receipt of a release signal.

Figure 3:
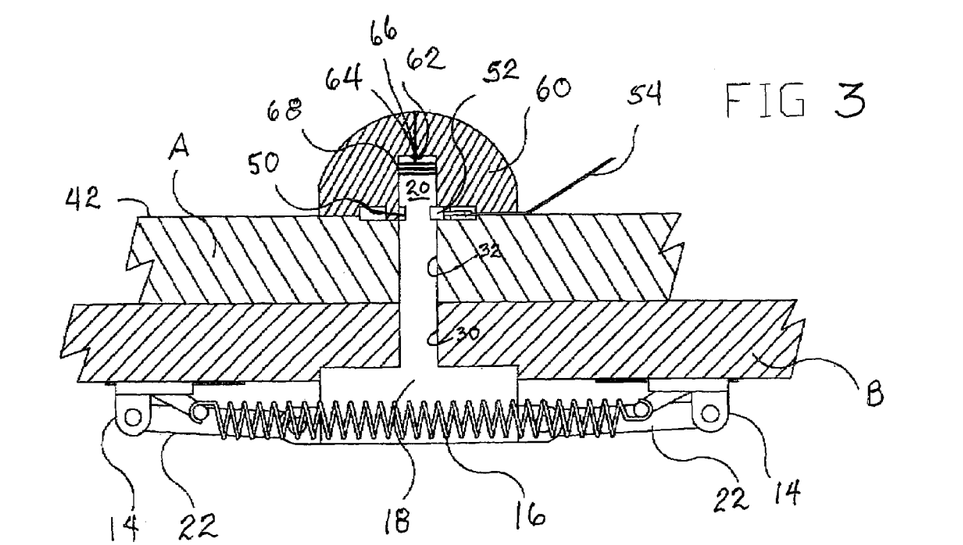
FIG. 3 is a side view of a further embodiment of the present invention in the lock position.
Figure 4:
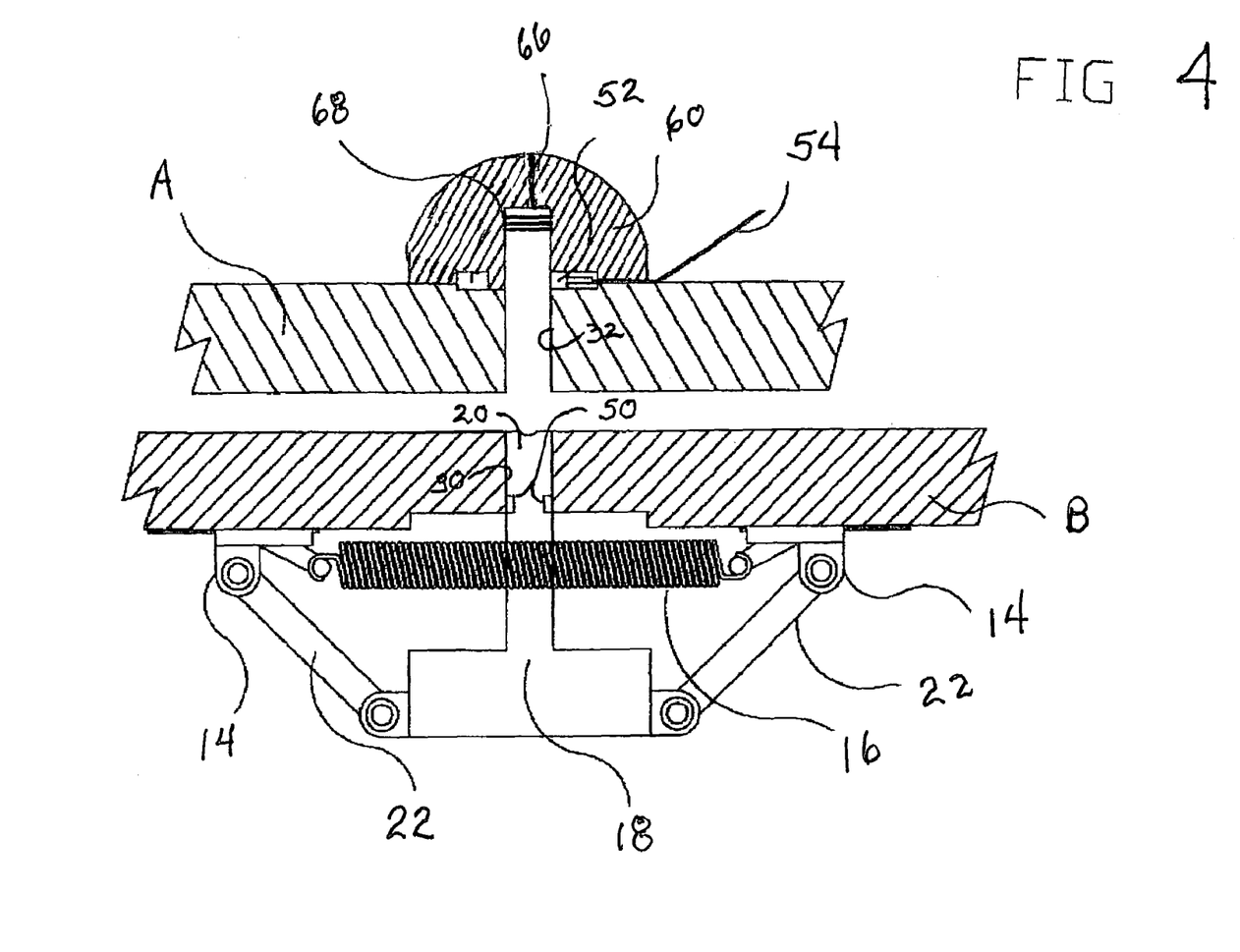
FIG. 4 is a side view of the embodiment of FIG. 3 in the unlock position.
Figure 5:
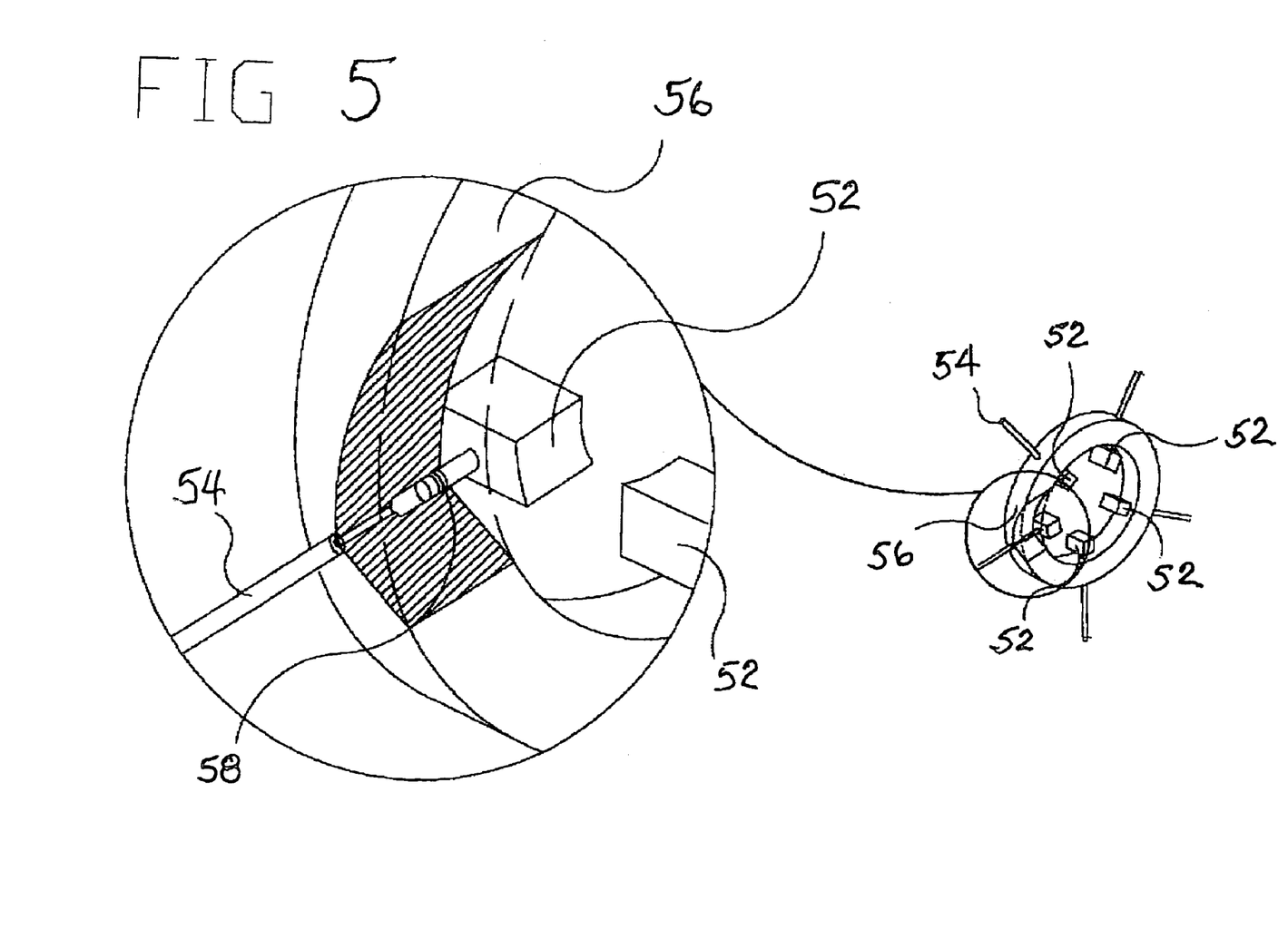
FIG. 5 is a partial pictorial representation of an embodiment of the locking ring of the present invention in the lock position.

With reference now to FIGS. 3–5, a further embodiment of the present invention includes one or more devices for holding the locking end 20 of the plunger 18 beyond the side 42 of the body A that is opposite the body B on which the lock 10 is carried. Such devices may be used together or separately when the second hole 32 extends entirely through body A so that the locking end 20 is exposed on side 42 of the body A. A feature of such devices is the surety of the holding of the two bodies together and the ability to release the lock from a location remote from the lock so that the two bodies can separate on command.

One such device includes a circumferential groove 50 in the locking end 20 of the plunger 18, and a movable wedge 52 that selectively engages the groove 50 and holds the plunger 18 in the lock position. A connection 54 may be provided to the wedge 52 that provides one of hydraulic and pneumatic power to move the wedge 52 into and out of engagement with the groove 50. As shown in FIG. 5, multiple wedges 52 may be provided that extend inward from a ring 56. Each of the wedges 52 may have its own connection 54 or one connection 54 may be provided for all wedges 52. Suitable seals 58 may be provided in the connection 54. When the two bodies joined by the lock are to be separated, the connection 54 may be used to provide hydraulic or pneumatic power to withdraw the wedges 52 from the groove 50 and permit the tensioning device 16 to withdraw the plunger 18 from the body A to permit its separation from body B. Operation of the connections 54 may be controlled from a location remote from the lock by a suitable control system.

Another device for holding the locking end 20 beyond side 42 includes a cap 60 on the locking end 20 of the plunger 18. The cap 60 has a sealable chamber 62 in which a distal end 64 of the plunger 18 is exposed, and has at least one passageway 66 for creating a partial vacuum in the chamber 62 to hold the plunger 18 in the lock position and/or for increasing a pressure in the chamber 62 to expel the locking end 20 from the cap 60. Suitable seals 68 may be provided to seal the chamber 62. The passageway 66 may be provided in the cap 60 as shown in FIG. 4 or through the plunger 18 that may be provided with a suitable opening (see FIG. 6) in top section 36. The cap 60 may be hemispherical or other shape suitable for its application and may have its bottom shaped to accommodate the ring 56, wedges 52 and connections 54 if both the cap and ring are used together (which is not required). When the two bodies joined by the lock are to be separated, the passageway 66 may be used to provide hydraulic or pneumatic power to increase the pressure in the chamber 62 to expel the locking end 20 of the plunger 18 from the cap 60 and permit the tensioning device 16 to withdraw the plunger 18 from the body A to permit its separation from body B. Operation of the passageway 66 may be controlled from a location remote from the lock by a suitable control system.

Figure 6:
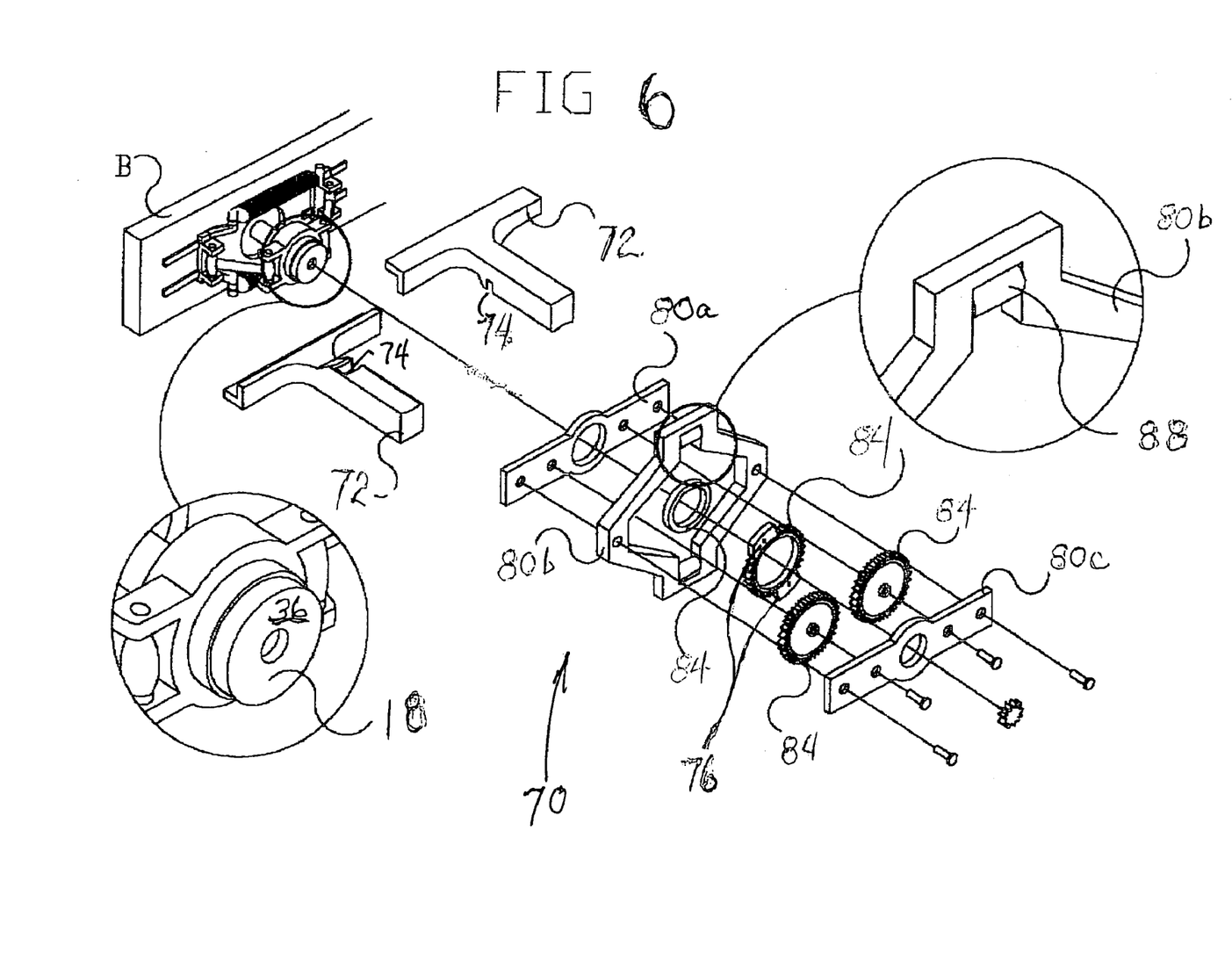
FIG. 6 is an exploded pictorial representation of a further embodiment of the present invention in the unlock position showing the mechanical release mechanism.
Figure 7:
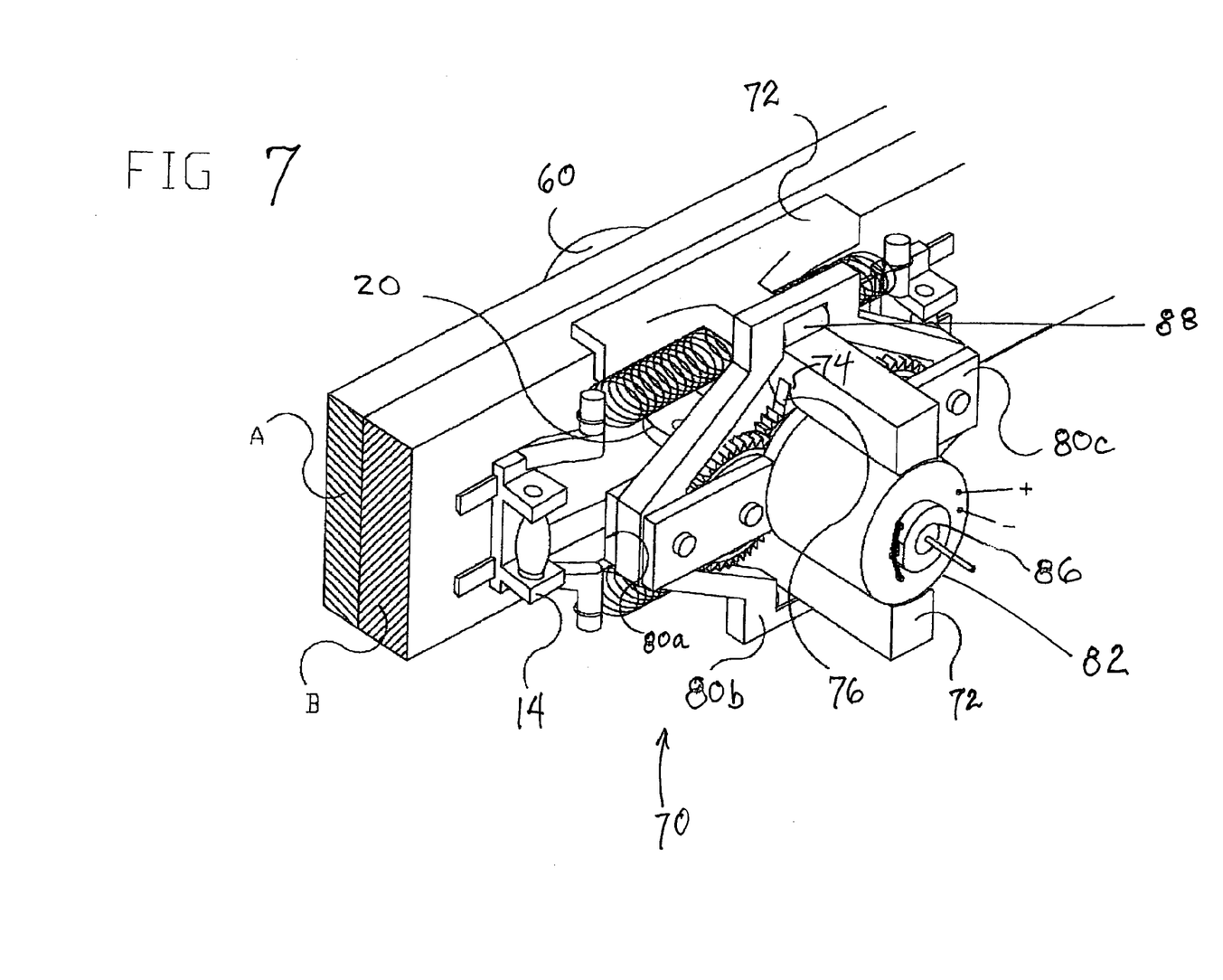
FIG. 7 is a partial pictorial representation of the release mechanism of FIG. 6 in the lock position.
Figure 8:
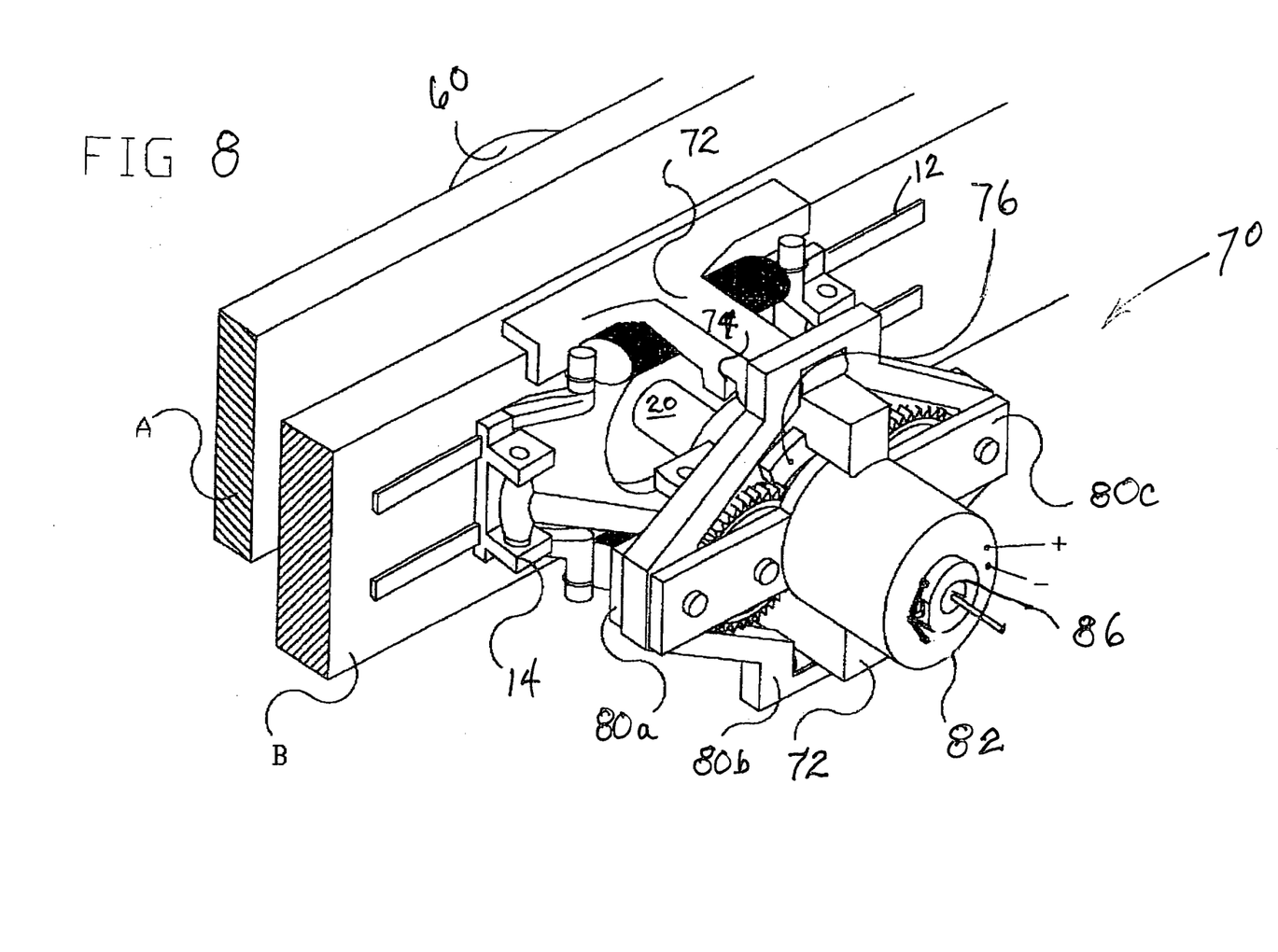
FIG. 8 is a partial pictorial representation of the release mechanism of FIG. 6 in the unlock position.

In a yet further embodiment shown in FIGS. 6–8, the lock includes a motor-operated release mechanism 70 that may be used instead of or in conjunction with one or more of the above-mentioned devices. This release mechanism 70 includes a member 72, such as a pillar, that is generally fixed in position relative to the lock and that extends above the lock generally parallel to the plunger 18. The member 72 has a notch 74 that will receive the flange 76 mentioned below. A movable bracket 80a–c engages an end of the plunger 18 opposite the locking end 20 and accommodates a motor 82 (FIG. 8). The flange 76 is rotatably attached to the bracket 80a–c and may be part of a gear network 84 that responds to rotation of a shaft 86 of the motor 82 to cause the flange 76 to engage the notch 74 to hold the plunger 18 in the lock position, and to cause the flange 76 to disengage from the notch 74 to permit the bracket 80a–c to slide away from the rail 12 by operation of the tensioning member 16 on the plunger 18. The gear network 84 may be of the helical type. Suitable rollers 88 may be provided to facilitate movement of the bracket along the member 72 after the flange has been disengaged from the notch. The motor 82 may be electrically operated or may be hydraulically or pneumatically driven. As with the previous embodiments, the motor may be controlled from a location remote from the lock.

Figure 9:
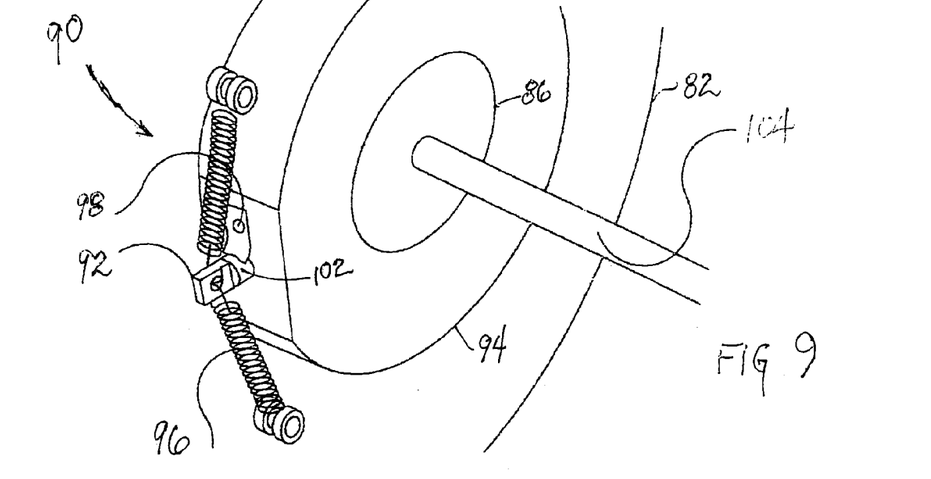
FIG. 9 is a partial pictorial representation of an embodiment of the motor shaft release mechanism in the lock position.
Figure 10:
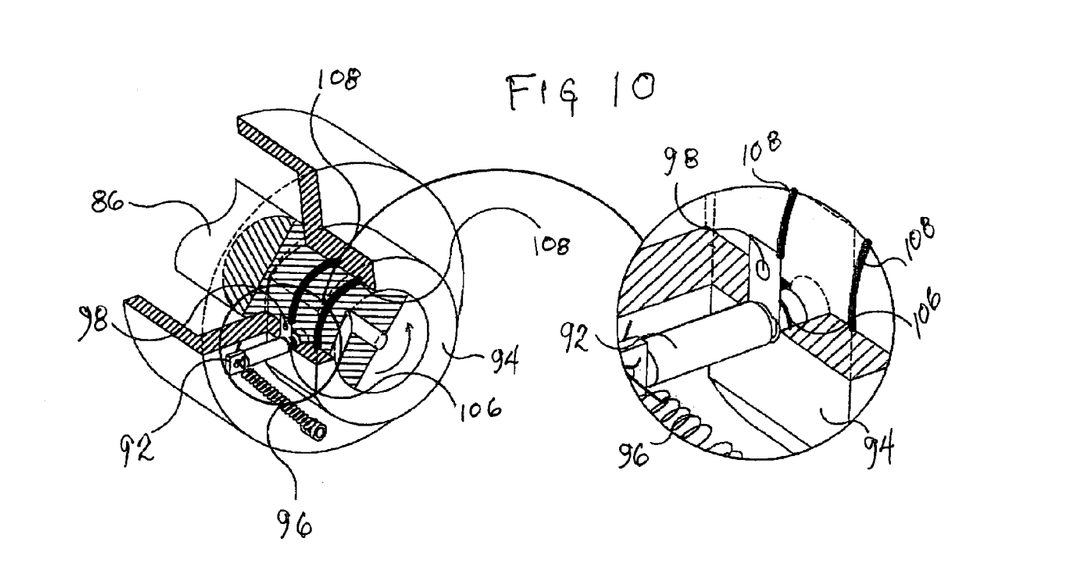
FIG. 10 is a partial cross section of the motor shaft release mechanism of FIG. 9 in the unlock position.

With reference now to FIGS. 9–10, the release mechanism 70 may also include a further mechanism for preventing inadvertent operation of the motor 82. In this embodiment, a motor shaft release mechanism 90 to release the motor shaft 86 by operation of hydraulic or pneumatic power is provided so that both power to operate the motor 82 and to operate the motor release are needed when the lock is to be moved to the unlock position. FIG. 9 shows the motor shaft release mechanism 90 in the shaft-locked configuration. A pin 92 extends through the shaft support 94 and into the motor shaft 86 to prevent rotation of the motor shaft. Springs 96 and a flexible clip 98 hold the pin in place. The clip 98 engages a first groove 102 in the pin 92. When the motor is to be operated, the pin 92 is pushed radially outward with hydraulic or pneumatic power provided through a conduit 104. As may be seen in FIG. 10, the pin 92 is pushed radially outward to free the motor shaft 86 and held in this position by the clip 98 that now engages a second groove 106 in the pin. Suitable seals 108 may also be provided. This conduit 104 may also be used to operate the other hydraulic or pneumatic mechanisms discussed above in other embodiments.

In a particular embodiment, the lock of the present invention is used to hold parts of an aircraft together and to release the parts in an emergency. The aircraft engines and/or airstream may provide pneumatic power for moving the lock to the unlock position. The parts may be held to the fuselage with the lock and separated on command from the cockpit to lighten the aircraft and/or prepare for a forced landing. The commands would break the detachable tie-down 40, withdraw the wedges 52 from the groove 50, expel the plunger 18 from the cap 60, and/or operate the motor-operated release mechanism 70 to permit the tensioning device 16 to withdraw the plunger to separate the parts from the fuselage. For example, the fuselage (or a part thereof containing people) could be fitted with a parachute and the wings and/or empennage or parts thereof may be released from the fuselage by releasing the locks that hold these components to the fuselage to lighten the load for the parachute. The lock described herein may be used with or in place of the locks described in the applicant's above-noted patent and application.

While embodiments of the present invention have been described in the foregoing specification and drawings, it is to be understood that the present invention is defined by the following claims when read in light of the specification and drawings.

I claim:

1. A plunger lock comprising:
   a rail and two spaced-apart cradles that are each movable on said rail;
   a longitudinally extended coil spring that is between and attached to said two cradles;
   a plunger that is between said two cradles and that is movable perpendicular to a longitudinal axis of said coil spring between a lock position and an unlock position, said plunger being in the lock position when a locking end of said plunger is spaced a first distance from said rail and in the unlock position when said locking end is closer to said rail than the first distance; and
   two levers that are each hinged to a different one of said two cradles and that are each hinged to said plunger and that cause said plunger to retreat from the lock position to the unlock position when said two cradles move toward each other.

2. The lock of claim 1, wherein said locking end of said plunger comprises a circumferential groove, and wherein said lock further comprises a movable wedge that selectively engages said groove and holds said plunger in the lock position.

3. The lock of claim 1, further comprising a cap on said locking end of said plunger wherein said cap has a sealable chamber in which a distal end of said plunger is exposed, and at least one passageway in one of said cap and said plunger for creating a partial vacuum in said chamber to hold said plunger in the lock position.

4. The lock of claim 1, further comprising a detachable tie-down that is attached to at least one of said two levers and holds said plunger in the lock position.

5. The lock of claim 1, further comprising a member that extends generally parallel to said plunger and that has a notch therein, a bracket that engages an end of said plunger opposite said locking end, and a flange that is rotatably attached to said bracket, said flange engaging said notch so that said bracket holds said plunger in the lock position and being rotatable out of engagement with said notch to permit said coil spring to move said two cradles toward each other and move said plunger to the unlock position.

6. A plunger lock comprising:
   a rail and two spaced-apart cradles that are each separately movable on a first surface of said rail;
   a tensioning device that is between and attached to said two cradles and that urges said two cradles toward each other;
   a plunger that is between said two cradles and that is movable perpendicular to said rail between a lock position and an unlock position, said plunger being in the lock position when a locking end of said plunger is spaced a first distance from said rail and said plunger is in the unlock position when said locking end is closer to said rail than the first distance; and
   two levers that are each hinged to a different one of said two cradles and that are each hinged to said plunger and that cause said plunger to retreat from the lock position to the unlock position when said two cradles move toward each other.

7. The lock of claim 6, wherein said locking end of said plunger comprises a circumferential groove, and wherein said lock further comprises a movable wedge that selectively engages said groove and holds said plunger in the lock position.

8. The lock of claim 7, further comprising a connection to said wedge that provides one of hydraulic and pneumatic power to move said wedge into engagement with said groove.

9. The lock of claim 6, further comprising a cap on said locking end of said plunger wherein said cap has a sealable chamber in which a distal end of said plunger is exposed, and at least one passageway in at least one of said cap and said plunger for creating a partial vacuum in said chamber to hold said plunger in the lock position and for increasing a pressure in said chamber to expel said locking end from said cap.

10. The lock of claim 6, wherein said rail comprises two parallel tracks on which said two cradles slide and wherein said plunger is between said two tracks.

11. The lock of claim 6, further comprising a tie-down that is detachably attached to at least one of said two levers and holds said plunger in the lock position.

12. The lock of claim 6, further comprising a fixedly positioned member that extends generally parallel to said plunger and that has a notch therein, a movable bracket that engages an end of said plunger opposite said locking end, and a flange that is rotatably attached to said bracket, said flange engaging said notch so that said bracket holds said plunger in the lock position and being rotatable out of engagement with said notch to permit said tensioning device to move said two cradles toward each other and move said plunger to the unlock position.

13. The lock of claim 12, further comprising a motor with a rotatable shaft that rotates said flange.

14. The lock of claim 13, further comprising a locking pin that selectively engages said shaft to prevent rotation of said shaft.

15. A combination of a first body, a second body, and a lock that joins said first and second bodies to each other,
   said first body having a first hole entirely through said first body and said second body having a second hole at least partially through said second body, said first and second holes being in registration when said first and second bodies are joined by said lock; and
   said lock comprising,
   a rail that is on a first surface of said first body opposite said second body and that is adjacent to said first hole,
   two spaced-apart cradles that are each separately movable on said rail,
   a tensioning device that is between and attached to said two cradles and that urges said two cradles toward each other,
   a plunger that is between said two cradles and that extends from said first surface through said first hole, said plunger having a locking end that is selectively movable into said second hole to join said first and second bodies, and two levers that are each hinged to a different one of said two cradles and that are each hinged to said plunger and that cause said locking end of said plunger to retreat from said second hole when said two cradles move toward each other.

16. The combination of claim 15, wherein said second hole extends entirely through said second body, wherein said locking end of said plunger comprises a circumferential groove, and wherein said lock further comprises a wedge on a second surface of said second body opposite said first body that selectively engages said groove and holds said plunger in said second hole.

17. The combination of claim 15, wherein said second hole extends entirely through said second body, and further comprising a cap on said locking end of said plunger and on a second surface of said second body opposite said first body, said cap having a sealable chamber in which a distal end of said plunger is exposed, at least one of said cap and said plunger having at least one passageway for creating a partial vacuum in said chamber to hold said plunger in said second hole and for increasing a pressure in said chamber to expel said locking end from said cap.

18. The combination of claim 15, further comprising a detachable tie-down that is attached to at least one of said two levers and to said first body and that holds said plunger in said second hole.

19. The combination of claim 15, further comprising a pillar that is fixedly positioned on said first body and that extends generally parallel to said plunger and that has a notch therein, a movable bracket that engages an end of said plunger opposite said locking end, and a flange that is rotatably attached to said bracket, said flange engaging said notch so that said bracket holds said plunger in said second hole and being rotatable out of engagement with said notch to permit said tensioning device to move said two cradles toward each other and move said plunger out of said second hole.

20. The combination of claim 19, further comprising a motor with a rotatable shaft that rotates said flange, and a locking pin that selectively engages said shaft to prevent rotation of said shaft.

* * * * *